Sept. 7, 1943.        W. H. LANNERT        2,328,655
SEWAGE TREATMENT SYSTEM
Filed Feb. 2, 1942        2 Sheets-Sheet 1
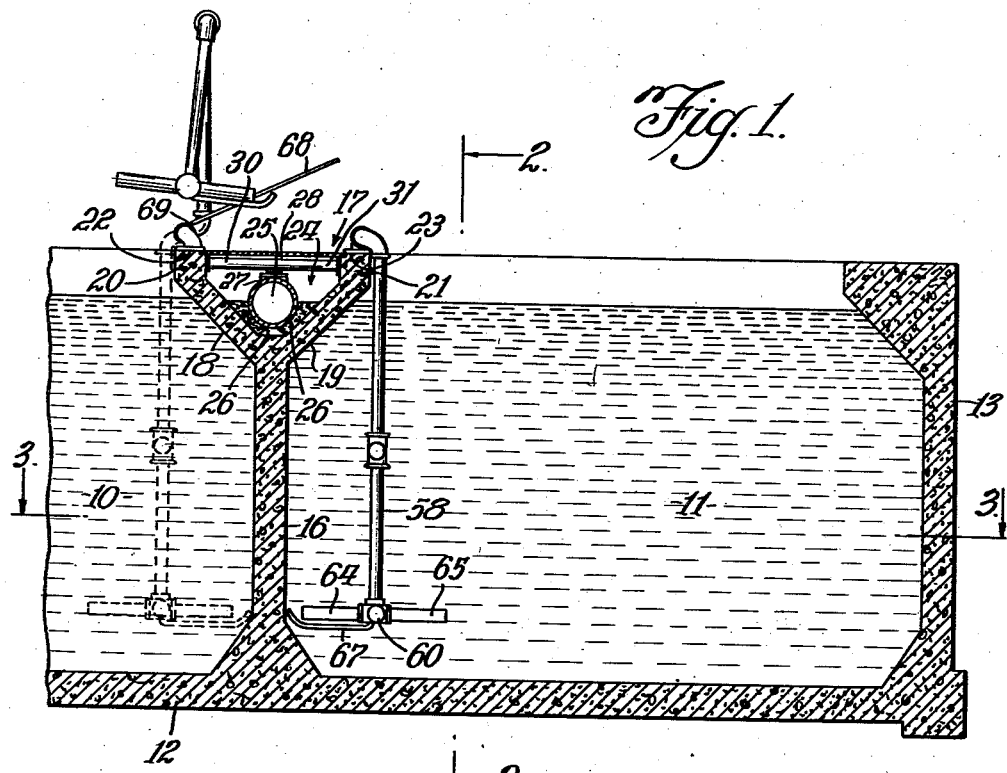
Fig. 1.
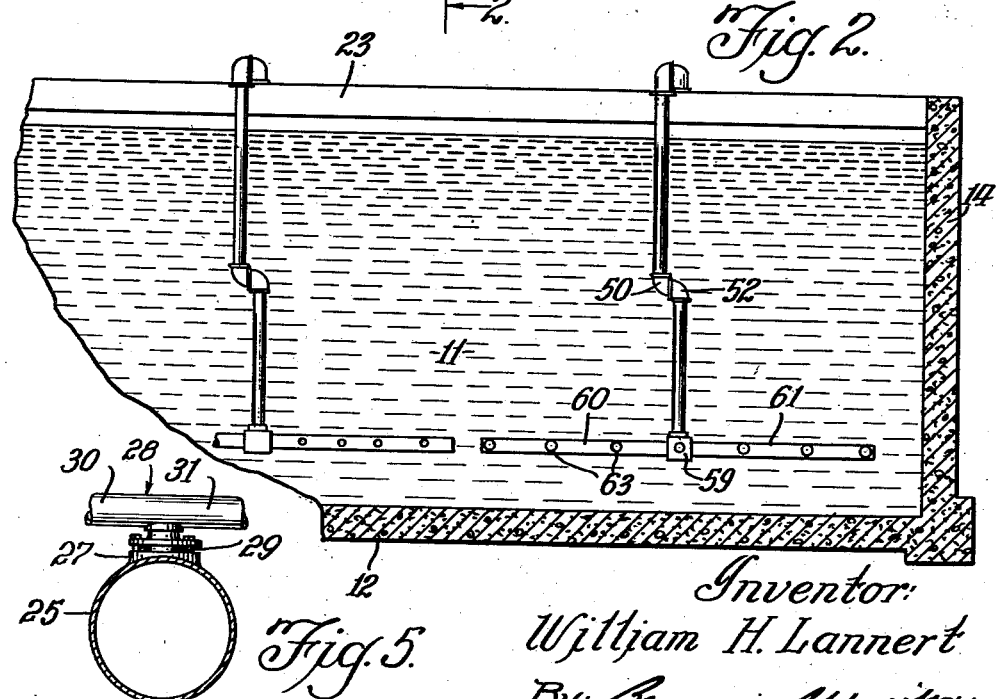
Fig. 2.
Fig. 5.
Inventor:
William H. Lannert
By: Benjamin Schneider Atty.

Sept. 7, 1943.  W. H. LANNERT  2,328,655
SEWAGE TREATMENT SYSTEM
Filed Feb. 2, 1942  2 Sheets-Sheet 2
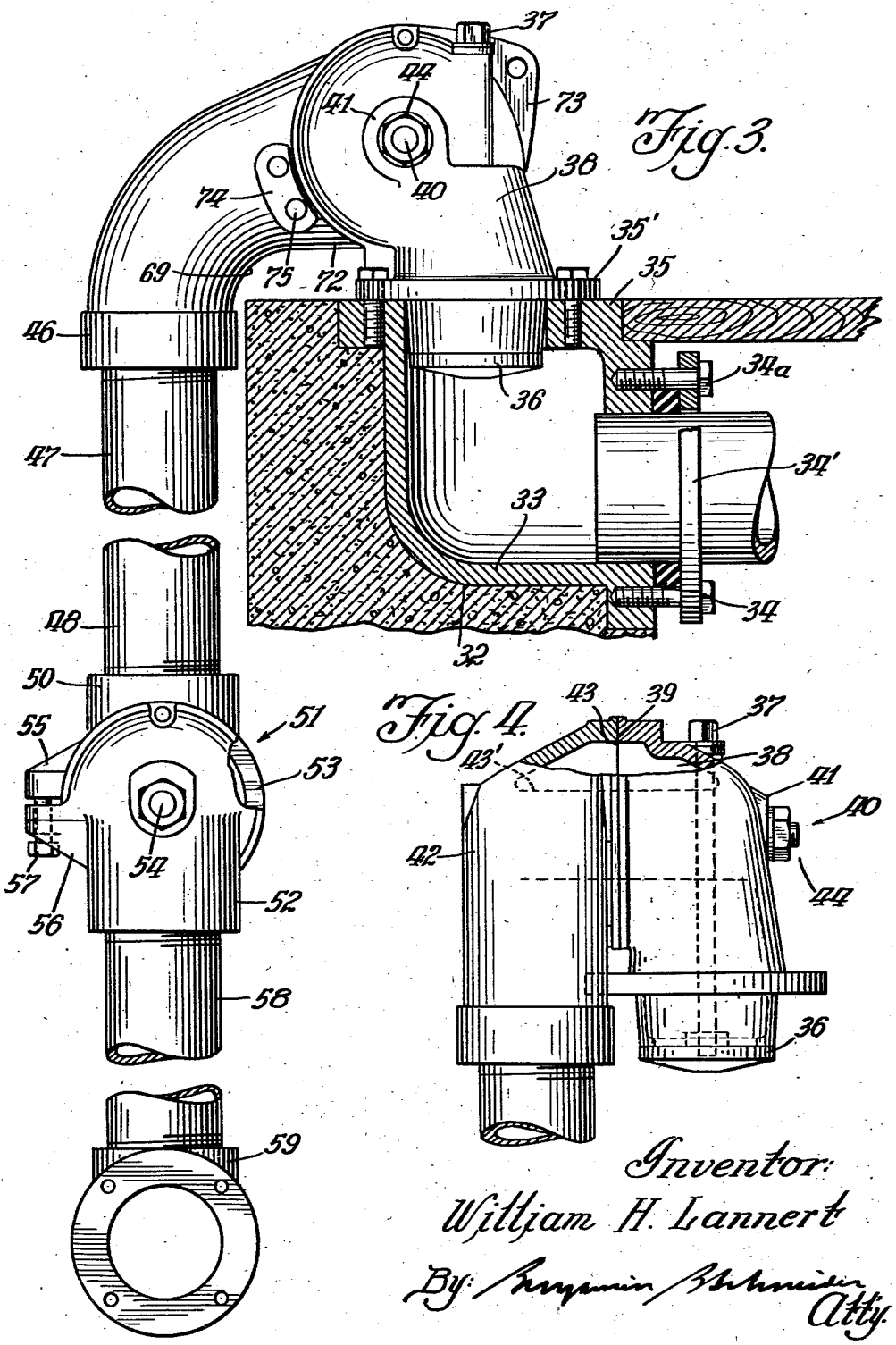

Patented Sept. 7, 1943

2,328,655

UNITED STATES PATENT OFFICE 2,328,655

SEWAGE TREATMENT SYSTEM

William H. Lannert, Skokie, Ill., assignor to Chicago Pump Co.

Application February 2, 1942, Serial No. 429,230

6 Claims. (Cl. 261—122)

This invention relates to sewage treatment systems and particularly to those systems having aeration sewage tanks embodying the use of "swing" diffusers.

Systems for aerating sewage customarily involve large tanks and extensive plumbing installations. In the design of a sewage plant, an important consideration is the amount and character of sewage. Due to varying conditions, it happens that the character and quantity of sewage may change during the life of the plant. Hence, it is important that a sewage plant not only be economical to install initially, but also be susceptible to ready and economical change after installation.

Systems of the above type for handling sewage have aerators disposed inside of tanks and well below the normal liquid level of the sewage. In order to facilitate servicing the aerator units, they have been mounted in a manner to permit of their removal or "swinging" from the tank. Such mountings have hitherto involved the disposition of relatively movable machined parts with exposed bearing surfaces within the sewage. Thus, for example, sprocket chains and sprocket wheels have been commonly disposed within the tank readily accessible to the sewage. Aerator units may remain untouched, as far as servicing is concerned, for periods as long as several years. This fact, together with the corrosive nature of liquids within the sewage, due principally to the presence of organic acids and active oxidation, makes it wholly undesirable to expose any machined surfaces to the liquid. It may happen that by the time an aerator unit requires servicing, it may be impossible to move the unit in a normal manner because the normally relatively movable parts of the aerator unit have become corroded.

Hence, it is apparent that infrequent service periods place a premium upon the elimination of any part of the aerator structure not used directly during normal aerator operation.

This invention provides a sewage system of the aeration type wherein the initial installation may be made in a simple and economical manner and may even be changed after installation without undue expense. Furthermore, this invention provides a simple system having aerator units free of complicated packings and which have no exposed machined parts disposed within the sewage. Thus for the first time it is possible to provide a simple, easily movable and readily assembled structure which is inherently protected against corrosion. Furthermore, each aerator unit may be manipulated or "swung" into or completely out of the aeration tank with a minimum of effort and power and within a minimum of space.

Referring now to the drawings:

Figure 1 shows a sectional elevation of a portion of a sewage handling system, with one aerator unit elevated;

Fig. 2 is a section on line 2—2 of Fig. 1; omitting the elevated aerator unit;

Fig. 3 is an enlarged detail of an aerator supporting unit;

Fig. 4 is a side elevation, partly in section, of the pivotal mounting of an aerator unit; and Fig. 5 is a detail of the mounting of a feeder T.

In the drawings, there is shown a pair of sewage tanks 10 and 11 having bottoms 12 and end walls (only one of each is shown) 13 and 14. The tanks may be of concrete or any other suitable material and may be constructed in any suitable manner. For the purposes of one phase of this invention, it is only necessary to show and describe a pair of adjacent tanks having a common partition wall, indicated at 16 here. It is understood that the tanks may be duplicated in either horizontal direction to provide as many units as may be necessary. Partition wall 16 extends toward tank top 17. Near the top, the partition takes one form of a Y having diverging branches 18 and 19, overhanging the ends of adjacent tanks 10 and 11. Diverging branches 18 and 19 terminate in vertical walls 20 and 21 having horizontally alined facing surfaces 22 and 23.

Lying in space 24 between diverging branches 18 and 19 is a main air supply pipe 25. This air main may be conveniently supported by saddles 26 formed at the crotch of the Y and extending continuously or disposed at intervals along the partition. Air main 25 may have bosses 27 cast along one side thereof and the pipe is installed so that these bosses are on the top side thereof.

Any one of the cast bosses 27 may be drilled. A T feeder section 28 may be connected through a flexible coupling including a flexible ring 29 to a boss and arms 30 and 31 thereof extend transversely between walls 20 and 21. The T section preferably lies below the level determined by faces 22 and 23 and the catwalk and extends into wells 32 formed in the concrete. Each well 32 may contain an elbow 33 flexibly coupled to the T arm end through a flexible ring 34 gripped between the opposing faces of the elbow and a flange 34' mounted on the T arm. Bolts 34a slidable in flange 34' are threaded into elbow 33. Elbow 33 has a base plate 35 to which is bolted a stanchion 35'. Stanchion 35' is hollow and has a valve 36 formed in the base thereof for controlling the flow of air. The valve may be made in any desired manner, and its position may be controlled by a bolt 37 extending upwardly and outwardly from the body of the stanchion. Stanchion 35 has a hollow head 38 having a general bell-shape and provided with a machined annular surface 39 lying in a vertical plane normal to the general plane of common partition 16. The entire stanchion may be a casting of iron or other metal.

Perpendicular to and symmetrical with annular surface 39 is a pivot pin 40 journalled in a boss 41. Carried by pin 40 is an elbow 42 having a machined annular surface 43 in sealing engagement with surface 39. Pivot bolt 40 may engage elbow 42 in any suitable fashion to maintain the same tightly in position against cooperating face 39 of the stanchion. As shown here, elbow 42 has a boss 43' cast in the hollow thereof and this boss is machined and threaded to accommodate the threaded end of pin 40. Nuts 44 on the outer end of pin 40 may maintain the assembly intact. Elbow 42 thus has communication with the air main and is adapted to supply air to an aerator unit. Elbow 42 may have a tapped end 46 into which is threaded a pipe section 47. The bottom end 48 of pipe section 47 is threaded into elbow 50 of an elbow joint 51. Elbows 50 and 52 forming joint 51 have cooperating sealing surfaces 53.

The joint is maintained in assembled relation by a pivot pin 54 threaded into elbow 50 and extending through elbow body 52 to the outside. The pivot pin may be drilled for pressure lubrication and preferably sufficient grease is disposed on all relatively movable surfaces to thoroughly seal against ingress of water. Normally the greased surfaces as well as the air pressure will keep all bearing surfaces sealed from sewage. Lugs 55 and 56 may be provided on elbows 50 and 52, respectively. Lug 56 may be tapped and stop bolt 57 threaded therein to cooperate with lug 55 to limit the swing of the two elbows forming the joint.

The air conduit continues beyond joint 51 in the form of a pipe section 58 extending from elbow 52 and carrying a T coupling 59 at the extreme end. The two pivot pins 40 and 54 and the line of the T 59 are normally parallel. T 59 may have bolted thereto manifolds 60 and 61 normally extending parallel to and spaced a short distance from the adjacent tank wall. These manifolds may have openings therein at spaced intervals along the length thereof, the openings preferably being alined along the median horizontal plane of the manifold in the normal depending position of the aerator unit.

Air diffusers 63 may extend from the manifold openings. These diffusers may be of any suitable material, such as porous ceramic or any solid impermeable material suitably foraminated to permit a general diffusion of air. The size and contour of individual diffusers and proximity between adjacent diffusers may be determined in a manner well-known to the art. The diffusers may be uniformly or non-uniformly disposed on the manifolds as desired. In general, the diffusers extend from the manifolds along horizontal lines normal to the manifolds both toward and away from the adjacent tank wall. Thus, as shown, a series 64 of diffusers extend toward the adjacent tank wall, here partition 16, and a series 65 of diffusers extend away therefrom.

Since air diffusers are generally mechanically weak, it is preferred to provide bumper guards 67 extending from T 59 toward the adjacent tank wall. The length of guards 67 may be adjusted to permit an aerator unit to swing to its predetermined position and stop.

The relative lengths of pipe sections 47 and 58 is unimportant, within limits. It is preferred, however, to proportion the various parts of an aerator unit so that when a unit is elevated or "swung" from the tank, as seen in Fig. 1 for example, the air diffusers clear the stanchion. In fact, the lengths of the pipe sections may be such that a workman may readily contact the air diffusers in their up position.

For raising an aerator unit, any suitable means may be provided. A cable 68 engaging the crook 69 of elbow 42 for elevating is merely illustrative.

Frequently, it is necessary to retain a unit in elevated position during extended servicing or for maintaining an aerator out of service. It is undesirable to engage a hoist under such circumstances. To provide such an anchoring position for the aerator unit, lugs 73 and 74 may be formed on the stanchion and elbow respectively. These lugs are so positioned that in the raised position of the unit the apertures therein register. In order to provide for some flexibility, one lug, here 74, may have an additional aperture 75 adapted to register with the aperture in lug 73 in a different raised aerator position. Any number of such positions may be selected. A pin may be passed through the registering lug apertures and will retain the aerator unit in predetermined elevated position independently of any hoist. It is understood that the air supply is shut off by the valve in the stanchion base during periods of aerator non-use.

It is evident from the foregoing that the initial installation of the plumbing is greatly simplified by the presence of an air main and the use of T's extending directly into the wells. The addition or elimination of feeder T's is simple. By virtue of the flexible couplings both at the T center and ends, substantial misalignment as well as difference in expansion and contraction between concrete and metal may be tolerated. The disposition of the air main in the Y of the wall makes drainage around the pipe simple and makes the piping open and readily accessible. Thus, the number and disposition of aerator feeders may be changed at any time. By having overhanging branches of the wall Y, the normal depending aerator position is secured by mere hanging from the stanchion pivot. During elevation, the jack-knife action of the two pipe sections greatly reduces the elevating effort and at the same time, brings the air diffusers within reach of an operator on the catwalk. Since the air diffusers are generally the only parts of a unit requiring service, it is important that they be readily accessible.

The number of machined bearing surfaces has been reduced to a minimum and none are exposed to sewage liquids. The manufacture, assembly and replacement of the various parts has been reduced to the simplest and most economical steps while greatly enhancing the efficiency and useful life thereof.

I claim:

1. In an aeration type of sewage treating apparatus, at least one sewage tank, said tank having a side wall with a top portion of said wall overhanging said tank, a hollow stanchion anchored in said overhanging portion of said wall, an air pipe section pivotally mounted on said stanchion for movement in a vertical plane generally normal to said wall, said pipe section having air communication with the hollow interior of said stanchion, a second pipe section jointedly carried by the free end of said first pipe section, said second pipe section being normally pivotally movable in a vertical plane generally parallel to the plane of movement of said first pipe section, an air diffuser unit carried by the free end of said second pipe section, and means for moving said first pipe section on its pivot so that said two pipe sections may depend into the tank in one position or may be folded in a jack-knife fashion up and out of the tank and over the wall in a raised position.

2. In an aeration type of sewage treating apparatus, at least two sewage tanks having a partition wall therebetween, said wall extending toward the tank tops and having diverging wall branches to form a general Y section, each Y branch overhanging the adjacent tank, a bridging section extending between the free ends of said Y branches to form a generally horizontal walk, an air main nested in said Y and extending along said partition wall, feeder T's below said walk extending from said air main, the T's having sections going to the Y branches on opposite sides of said air main, stanchions anchored in said Y sections, said stanchions being hollow and communicating with said T's and an aerator unit pivotally mounted on each stanchion, said units being disposed in tandem across the partition wall.

3. In an aeration type of sewage treating apparatus, a sewage tank including a tank wall, two jointed air pipe sections normally extending vertically within the tank, an air diffuser unit carried at the free end of the lower of said sections, and means for pivotally mounting the free end of the upper section adjacent the upper edge of said wall and outside of any normal level of the sewage liquid, said pivotal mounting permitting said jointed air pipe sections to hang down into the tank with the air diffuser unit being disposed in said sewage at a predetermined point below the normal liquid level thereof, the diffuser carrying pipe section being adapted to hang vertically at all times when the other pipe section is elevated or dropped, and means for turning said upper pipe section on said pivotal mounting to raise said air diffuser unit up and out of the tank and over the wall thereof or lower the same into the tank.

4. The aeration sewage apparatus of claim 3 wherein means are provided for retaining the jointed pipe sections in a fixed elevated position over said tank wall and within easy reach thereof.

5. In an aeration type of sewage treating apparatus, a sewage tank including a tank wall, a pair of jointed air pipe sections normally extending vertically within the tank, an air diffuser unit carried by the lower of said pipe sections at the free end thereof, means for pivotally mounting the free end of the upper pipe section adjacent the upper edge of said wall and outside of said tank, the joint between said sections being such that said lower pipe section tends to hang vertically in all positions of said upper pipe section, and means for turning said upper pipe section on said pivotal mounting to raise said air diffuser unit up and out of the tank and over the wall thereof or lower the same into the tank.

6. In an aeration type of sewage treating apparatus, at least two tanks having a partition wall in common, said partition wall extending toward the tank tops and having diverging branches to form a general Y section with each Y branch overhanging the adjacent tanks, an air main nested in said Y and extending along said partition wall, feeders extending from said air main to said Y branches, a hollow stanchion anchored in a Y branch for each air feeder pipe, and an aerator unit for each hollow stanchion normally extending vertically within the tank, said unit consisting of a pipe pivotally mounted on said stanchion, a second pipe jointedly secured to the pivotally mounted pipe and an air diffuser carried by said second pipe, the joint between said pipes being such that said second pipe tends to hang vertically in all positions of said pivotally mounted pipe, and means for turning said pivotally mounted pipe to raise the said air diffuser up and out of the tank and over the said wall or lower the same into the tank.

WILLIAM H. LANNERT.